United States Patent [19]
Goettsche et al.

[11] Patent Number: 5,475,774
[45] Date of Patent: Dec. 12, 1995

[54] OPTICAL FIBER SENSOR COIL USING REVERSE QUADRUPOLES AND METHOD OF WINDING SAME

[75] Inventors: Randy P. Goettsche; Ralph A. Bergh, both of Phoenix, Ariz.

[73] Assignee: Honeywell Inc., Minneapolis, Minn.

[21] Appl. No.: 268,716

[22] Filed: Jun. 30, 1994

Related U.S. Application Data

[63] Continuation of Ser. No. 87,115, Jul. 1, 1993, abandoned, which is a continuation of Ser. No. 940,974, Sep. 4, 1992, abandoned, which is a continuation of Ser. No. 797,342, Nov. 25, 1991, abandoned.

[51] Int. Cl.⁶ ............................ G02B 6/02; B65H 18/28; G01B 9/02; H01J 5/16
[52] U.S. Cl. ............................ 385/12; 385/123; 385/137; 385/147; 242/159; 242/174; 242/176; 242/166; 356/350; 250/227.14
[58] Field of Search .............................. 385/12, 115, 123, 385/134, 136, 137, 147; 242/159, 174, 176, 166; 356/350; 250/227.14

[56] References Cited

U.S. PATENT DOCUMENTS

| | | | |
|---|---|---|---|
| 4,370,020 | 1/1983 | Davey | 385/147 |
| 4,527,749 | 7/1985 | Matthews et al. | 242/7.15 |
| 4,534,222 | 8/1985 | Finch et al. | 250/227.14 |
| 4,699,451 | 10/1987 | Mohr | 385/134 X |
| 4,702,599 | 10/1987 | Mohr | 356/350 |
| 4,743,115 | 5/1988 | Arditty et al. | 356/350 |
| 4,755,051 | 7/1988 | Cahill et al. | 356/345 |
| 4,768,856 | 9/1988 | Hofmann et al. | 385/147 |
| 4,781,461 | 11/1988 | Baron et al. | 356/350 |
| 4,786,173 | 11/1988 | Fournier et al. | 356/350 |
| 4,793,708 | 12/1988 | Bednarz | 356/350 |
| 4,856,900 | 8/1989 | Ivancevic | 356/350 |
| 4,883,337 | 11/1989 | Dahlgren | 385/147 |
| 4,928,894 | 5/1990 | Ohno et al. | 242/7.09 |
| 4,955,688 | 9/1990 | Chapin et al. | 385/123 |
| 4,957,344 | 9/1990 | Chesler et al. | 385/123 |
| 4,995,698 | 2/1991 | Myers | 385/147 |
| 5,056,885 | 10/1991 | Chinn | 356/350 |
| 5,074,665 | 12/1991 | Huang et al. | 356/350 |
| 5,085,501 | 2/1992 | Sakuma et al. | 356/350 |
| 5,168,539 | 12/1992 | Negishi et al. | 385/123 |

FOREIGN PATENT DOCUMENTS

| | | | |
|---|---|---|---|
| 0292103 | 3/1988 | European Pat. Off. | 356/350 X |
| 3425053 | 2/1986 | Germany | 356/350 X |
| 63-33612 | 2/1988 | Japan | 356/350 X |
| 1305310 | 12/1989 | Japan | 356/350 X |
| 1-305310 | 12/1989 | Japan | 385/115 X |

OTHER PUBLICATIONS

Shupe, "Thermally Induced nonreciprocity . . . " Applied Optics vol. 19 (5), pp. 654–655 (1980) (no month).

(List continued on next page.)

*Primary Examiner*—Brian Healy
*Attorney, Agent, or Firm*—John G. Shudy, Jr.; Trevor B. Joike

[57] ABSTRACT

In a optical fiber coil arrangement for use in rotation sensors, for example, errors resulting from axial and/or radial time varying temperature gradients can be minimized or substantially eliminated by employing reverse quadrupoles for the sensor coil. One of the quadrupoles is wound in a +−−+ winding configuration. However, the next adjacent quadrupole is wound in a −++− winding configuration. This reverse quadrupole arrangement substantially eliminates radial time varying temperature gradient dependent errors and reduces axial time varying temperature gradient dependent errors. The axial time varying temperature gradient dependent errors can be substantially eliminated by winding a reverse octupole arrangement. Accordingly, a reverse octupole arrangement is wound with a +−−+−++−−++−−+ winding configuration. Alternatively, the axial time varying temperature gradient dependent errors can be substantially eliminated by providing extra lengths of the "+" and "−" ends which are axially displaced so as to substantially eliminate this axial time varying temperature gradient dependent error.

26 Claims, 7 Drawing Sheets

OTHER PUBLICATIONS

Bergh, "All–Fiber Gyroscope with Optical–Kerr–Effect Compensation" pp. 1–121 May, 1983.

Frigo, "Compensation of Linear Sources . . . " from Fiber Optic and Laser Sensors I, Proc. SPIE vol. 412, 268–271 (1983) (no month).

| LAYER L | (2i-M-1) | RELATIVE Ṫ FACTOR | LAYER ERROR | QUAD ERROR | OCT ERROR |
|---|---|---|---|---|---|
| 1 | -15 | 0 | 0 | | |
| 16 | 15 | 1 | 15 | +28 | |
| 15 | 13 | 1 | 13 | | |
| 2 | -13 | 0 | 0 | | +8 |
| 14 | 11 | 0 | 0 | | |
| 3 | -11 | 1 | -11 | -20 | |
| 4 | -9 | 1 | -9 | | |
| 13 | 9 | 0 | 0 | | |
| 12 | 7 | 0 | 0 | | |
| 5 | -7 | 1 | -7 | -12 | |
| 6 | -5 | 1 | -5 | | |
| 11 | 5 | 0 | 0 | | -8 |
| 7 | -3 | 0 | 0 | | |
| 10 | 3 | 1 | 3 | +4 | |
| 9 | 1 | 1 | 1 | | |
| 8 | -1 | 0 | -1 | | |

Ṫ₁  Ṫ₂

$\Delta\dot{T} = \dot{T}_2 - \dot{T}_1$ $\Omega_e = 0$

Fig. 6

| LAYER | (2i-M-1) | RELATIVE † FACTOR | LAYER ERROR | QUAD ERROR | OCT ERROR |
|---|---|---|---|---|---|
| 1 | -15 | 1 | -15 | | |
| 16 | 15 | 2 | 30 | +2 | |
| 15 | 13 | 3 | 39 | | |
| 2 | -13 | 4 | -52 | | 0 |
| 14 | 11 | 5 | 55 | | |
| 3 | -11 | 6 | -66 | -2 | |
| 4 | -9 | 7 | -63 | | |
| 13 | 9 | 8 | 72 | | |
| 12 | 7 | 9 | 63 | | |
| 5 | -7 | 10 | -70 | -2 | |
| 6 | -5 | 11 | -55 | | |
| 11 | 5 | 12 | 60 | | 0 |
| 7 | -3 | 13 | -39 | | |
| 10 | 3 | 14 | 42 | +2 | |
| 9 | 1 | 15 | 15 | | |
| 8 | -1 | 16 | -16 | | |

$\Omega_e = 0$

OPTICAL FIBER SENSOR COIL USING REVERSE QUADRUPOLES AND METHOD OF WINDING SAME

The government has rights in this invention pursuant to Contract No. N66001-90-C-0162 awarded by DARPA. This is a continuation of U.S. application Ser. No. 08/087,115 filed Jul. 1, 1993, now abandoned, which is a continuation of U.S. application Ser. No. 07/940,974, filed Sep. 4, 1992, now abandoned, which is a continuation of application Ser. No. 07/797,342 which was filed on Nov. 25, 1991, now abandoned.

FIELD OF THE INVENTION

The present invention relates to fiber optic coils and, more particularly, to fiber optic coils used in rotation sensors.

BACKGROUND OF THE INVENTION

This invention relates to a rotation sensor used for an advanced global positioning and inertial guidance system.

Optical rotation sensing devices include ring laser gyros, fiber optic rotation sensors, and the like. The fiber optic rotation sensor ordinarily comprises an interferometer which includes a light source, a beam splitter, a detector, and a light path which is mounted on a rotatable platform. Light from the light source is split by the beam splitter into two beams which are directed to opposite ends of the optical path and which then counterpropagate around that path. The light beams exit the light path, the light beams are recombined, and the resulting combined light beam is sensed by a detector. A sensing circuit connected to the detector determines any phase difference between the counterpropagating light beams.

Assuming that this fiber optic rotation sensor experiences no rotation, ideally no difference in phase between the counterpropagating light beams will be detected. On the other hand, if the sensor experiences rotation, there will be a phase difference between the counterpropagating light beams which can be detected to indicate the extent and direction of rotation.

In a fiber optic rotation sensor, an optical fiber is coiled, usually in multiple layers, around a spool, with each layer containing multiple turns. Currently, such coils are typically wound as quadrupoles. In order to form a quadrupole coil, each half of a continuous optical fiber is first wound onto respective intermediate spools. The first spool is then used to wind a first layer of turns in a clockwise direction around a sensor spool. This first layer is wound around the sensor spool from the first end to the second end of the sensor spool. The second spool is then used to wind a second layer of turns in a counterclockwise direction around a sensor spool. This second layer is wound around the sensor spool from the first end to the second end of the sensor spool. The fiber on the second spool is then wound back from the second end to the first end of the sensor spool to form a third layer. The first spool is then used to wind a fourth layer of turns from the second end of the spool to the first end. Thus, one half (i.e. one end) of the optical fiber is used to form the first and fourth layers of turns and the other half (i.e. the other end) is used to form the second and third layers. These four layers of turns are usually referred to as a quadrupole. If "+" and "−" are used to designate the first and second halves or ends of the optical fiber respectively, this quadrupole is wound with +−−+ layers. The quadrupole is repeated for as many layers as is desired for the optical path. Accordingly, a second quadrupole will be wound with +−−+ layers about the first quadrupole so that the resulting two quadrupole arrangement will have a +−−++−−+ layer configuration.

When a fiber optic coil wound in this fashion is subjected to an axial and/or radial time varying temperature gradient, there will be a phase difference between the counterpropagating light beams which results in a false indication of rotation; that is, this phase difference is an error which produces a false indication of rotation.

SUMMARY OF THE INVENTION

This error can be substantially reduced by employing reverse quadrupoles for the sensor coil. One of the first quadrupoles is wound using the first end of the fiber to wind the first layer, the second end to wind the second and the third layers, and the first end to wind the fourth layer. An adjacent quadrupole is then wound by reversing the winding sequence; that is, the second end of the fiber is used to wind the fifth layer, the first end to wind the sixth and seventh layers, and the second end to wind the eighth layer. These two reverse quadrupoles are referred to herein as an octupole. This octupole materially reduces axial time varying temperature gradient dependent errors and substantially eliminates radial time varying temperature gradient dependent errors. Accordingly, an octupole with +−−+−++− layers results in a marked improvement over prior art coils.

The axial time varying temperature gradient dependent errors can be substantially eliminated by winding a reverse octupole. Accordingly, a ninth layer is wound using the second end, the tenth and eleventh layers are wound using the first end, the twelfth layer is wound using the second end, the thirteenth layer is wound using the first end, the fourteenth and fifteenth layers are wound using the second end and the sixteenth layer is wound using the first end. This reversed octupole arrangement is wound with +−−+−++−−++−+−−+ winding configuration for a total of 16 layers.

Alternatively, axial time varying temperature gradient dependent errors can be substantially eliminated by axially displacing extra lengths of the first and second ends from one another. For example, after the coil is wound, extra turns of the first and second ends may be wound around the octupole outer circumference so that the extra turns of the first end are axially displaced from the extra turns of the second end. The number and placement of these extra turns may be selected to eliminate these errors.

BRIEF DESCRIPTION OF THE DRAWINGS

These and other features and advantages will become more apparent from a detailed consideration of the invention when taken in junction with the drawings in which:

FIG. 6 is a table showing the zero net axial time varying temperature gradient dependent error of the sixteen layer reverse octupole device;

DETAILED DESCRIPTION

Figure 1:
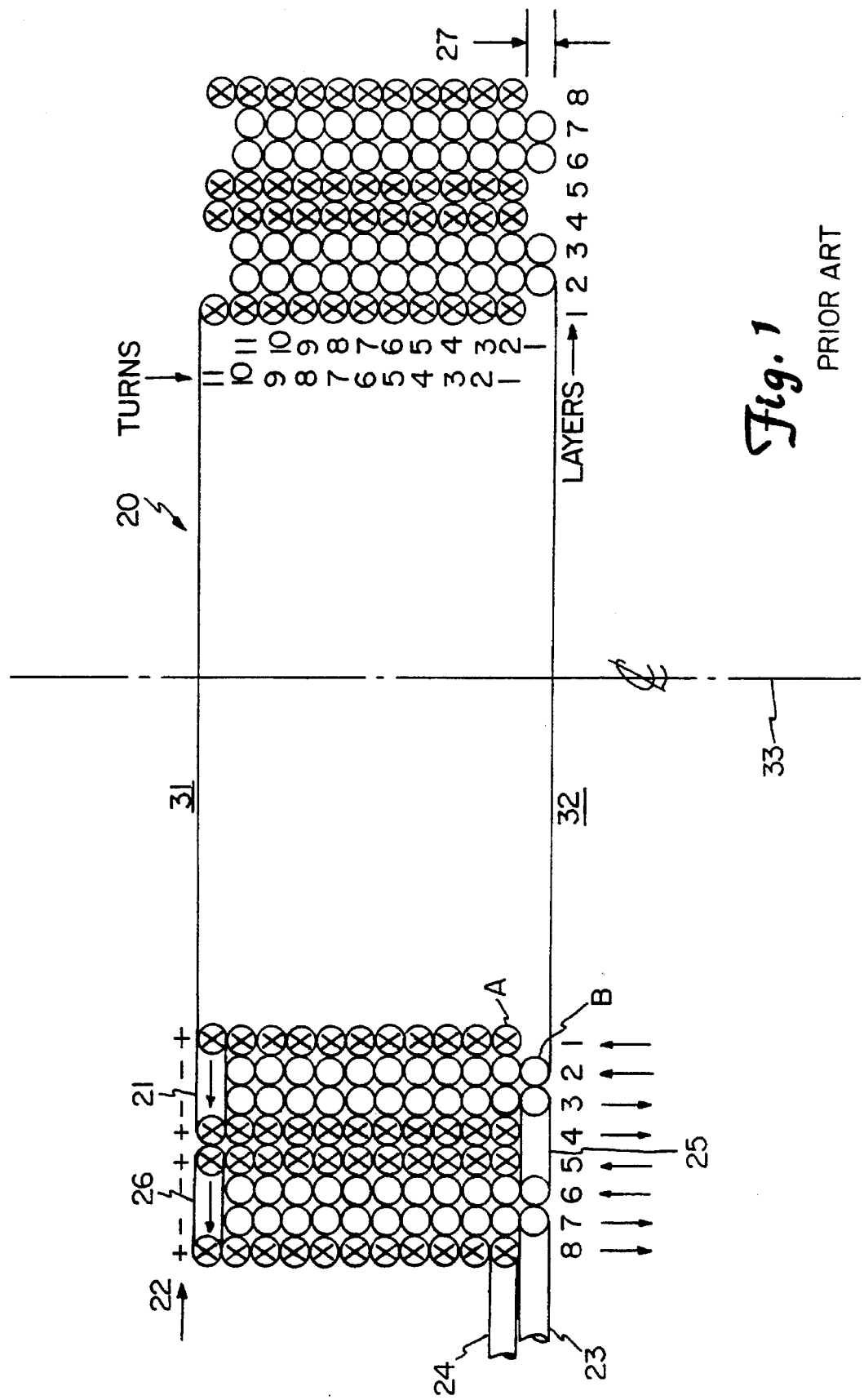
FIG. 1 shows a prior art fiber optic coil arrangement.
Figures 7, 8:
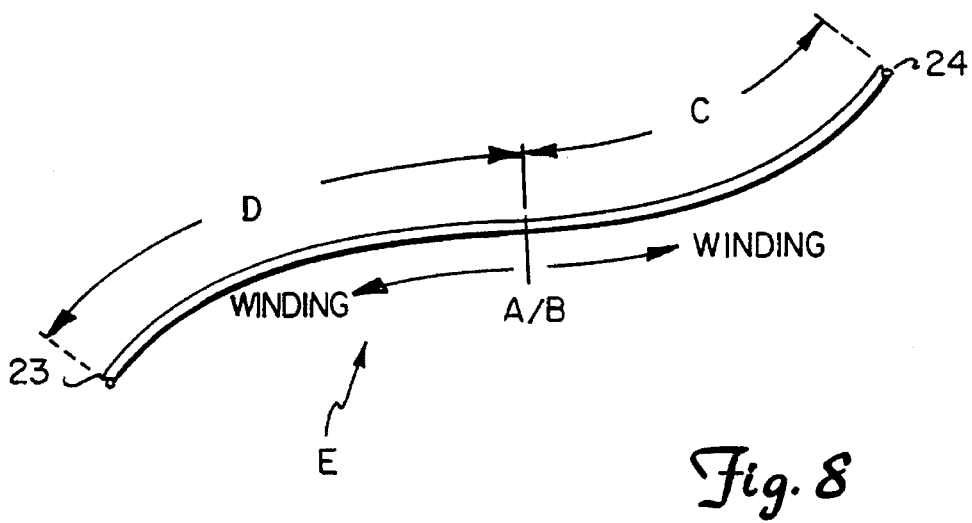
FIG. 7 is a table showing the zero net radial time varying temperature gradient dependent offset of either a reverse quadrupole or a reverse octupole device; and, FIG. 8 shows an optical fiber useful in winding the coil according to the present invention.

As shown in FIG. 1, the typical quadrupole fiber optic coil 20 is wound using the ends of a continuous optical fiber, such as the optical fiber shown in FIG. 8. Accordingly, layer 1 is wound clockwise from near the middle A/B of the fiber E using first end C. Layer 1 is wound in an upward direction as viewed in FIG. 1, i.e. each turn in the layer is formed above its preceding turn. When the desired number of turns of layer 1 are wound, layer 2 is wound counterclockwise from near the middle A/B of the fiber E using second end D. Layer 2 is wound in an upward direction as viewed in FIG. 1. At end 31 of coil 20, counterclockwise winding of the second end D continues in a downward direction to wind layer 3. The first end C is bridged over to layer 4 by way of loop 21 and layer 4 is wound clockwise in the downward direction. Layer 5 is wound clockwise, using the first end C, in the upward direction. The second end D of the fiber E is bridged from layer 3 to layer 6 by way of loop 25 and layers 6 and 7 are wound counterclockwise in the directions of the arrows. The first end C of the fiber E is bridged from layer 5 to layer 8 by way of loop 26 and layer 8 is wound clockwise in the direction of the arrow from end 31 to end 32 of coil 20. As can be seen in FIG. 1, the turns with the "X" indicate the first end C of the fiber which is wound in one of the clockwise or counterclockwise directions and the turns without the "X" indicate the second end D of the fiber which is wound in the other of the clockwise or counterclockwise directions. These layers, for convenience, are indicated with "+" and "−" symbols at 22 in order to indicate which end of the fiber is used to wind the layer as well as the relative direction of winding. Layers 1–4 form a first quadrupole and layers 5–8 form a second quadrupole. As shown in FIG. 1, the two quadrupoles have the same +−−+ winding configuration.

As the arrows in FIG. 8 indicate, winding of layers 1 and 2 begins near the middle A/B of the fiber and proceeds, in the direction of the FIG. 8 arrows, from the middle A/B toward extremities 24 and 23 respectively. Extremity 23 of the second end D of the fiber is brought out of coil 20 and extremity 24 of the first end C of the fiber is also brought out of coil 20. Two light beams, which are used to counter-propagate along the path provided by the optical fiber E, are injected into respective extremities 23 and 24. One light beam, injected into extremity 23, propagates in order through layers 7, 6, 3, 2, 1, 4, 5 and 8 to exit extremity 24. The other light beam, injected into extremity 24, counter-propagates in order through layers 8, 5, 4, 1, 2, 3, 6 and 7 to exit extremity 23. The exiting light beams are recombined and are sensed by a detector so that the phases can be compared.

As can be seen from the right-hand side of FIG. 1, because of the way in which quadrupole fiber optic coils are wound, the "+" and "−" layers are offset by an axial distance 27. As a resulting of the winding process, this axial distance can be one fiber diameter as shown, a fraction of a fiber diameter, or several fiber diameters. Because of this axial spatial offset, if an axial time varying thermal gradient is applied to the fiber optic coil, turns of the "+" layers see a slightly different rate of temperature change than do the corresponding turns of the "−" layers. That is, turn 1 of layer 1 is offset from turn 1 of layer 2 by the amount 27, turn 2 of layer 1 is offset from turn 2 of layer 2 by the amount, and so on. It can be seen that, because the "−" half of the coil is spatially offset from the "+" half of the coil, there is a slightly different rate of temperature change that is experienced by the counter-propagating light beams travelling through corresponding turns of the "+" and "−" halves of the coil. (The coil halves of coil 20 are (1) all of the "+" turns which are wound in the clockwise direction and (2) all of the "−" turns are wound in the counterclockwise direction). Consequently, the counterpropagating light beams travel through different path lengths, which results in a phase difference between the light beams. This phase difference is defined herein as an error because it is not related to rotation of the rotation sensor.

The time varying temperature gradient can be given by the following equation:

$$\frac{\Delta T_{ax}}{\Delta t} = \frac{\Delta T_{31}}{\Delta t} - \frac{\Delta T_{32}}{\Delta t} \qquad (1)$$

where $\Delta T_{31}/\Delta t$ is the rate of temperature change at end 31 of the coil, $\Delta T_{32}/\Delta t$ is the rate of temperature change at end 32 of the coil, and $\Delta T_{ax}/\Delta t$ is the axial difference between the rates of temperature change at the two ends of the coil. The difference d in the rates of temperature change between corresponding turns of the "+" and "−" layers (which are separated by distance 27) is $\Delta T_{ax}/\Delta t$ divided by the number of turns in a layer. Although this difference d is quite small, the effect of this small difference accumulates over an entire coil half and becomes relatively large. The accumulation of this effect over the entire coil produces a phase difference between the counterpropagating beams which will result in a relatively large false indication of rotation.

Figure 2:
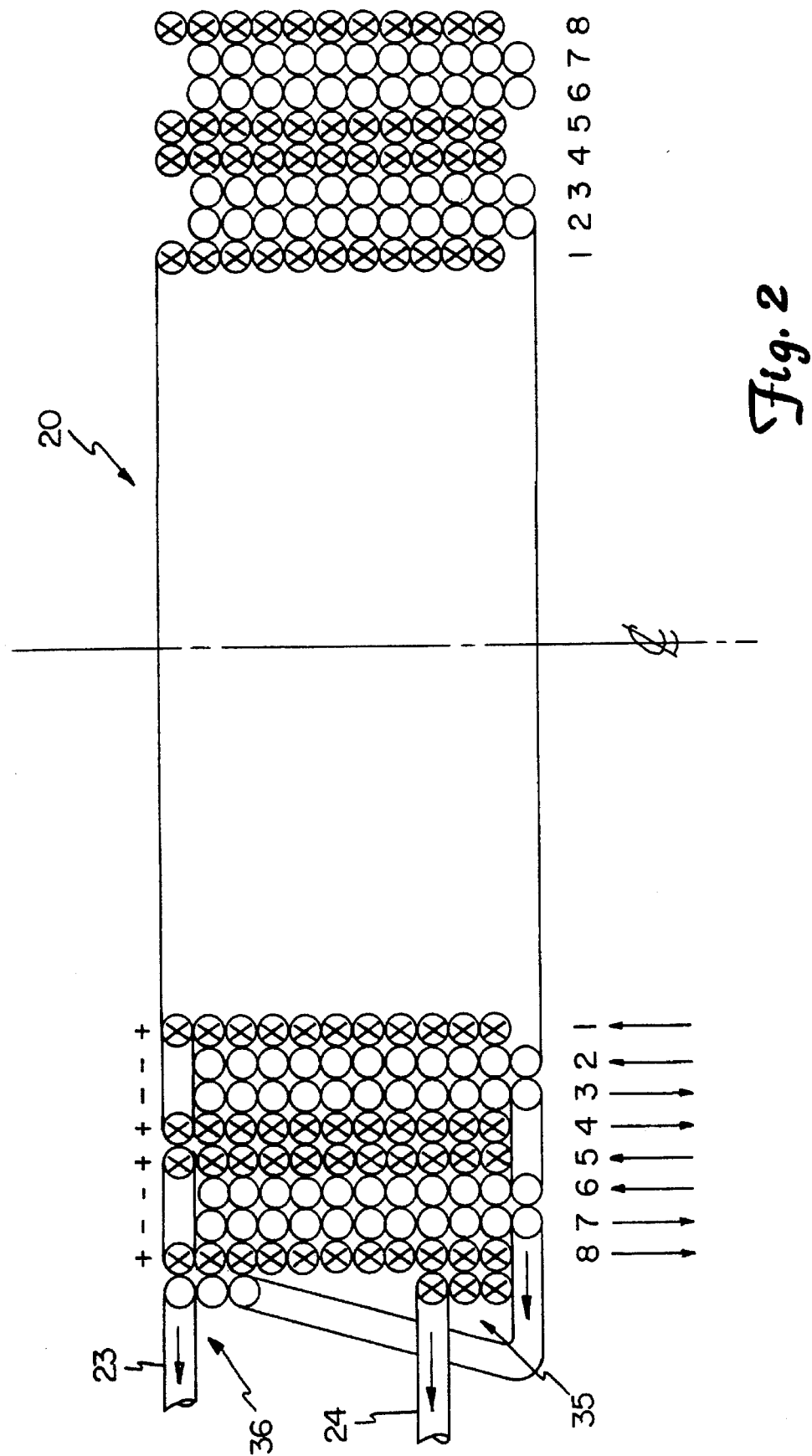
FIG. 2 shows an arrangement for substantially eliminating axial time varying temperature gradient dependent errors of the prior art coil arrangement shown in FIG. 1.

One manner of reducing this axial time varying temperature gradient dependent error is to axially displace extra lengths of the first and second ends of the fiber from one another. For example, as shown in FIG. 2, after layer 8 has been wound with the "+" end of the fiber, the "+" end of the fiber is wound around the outside diameter of coil 20 by a predetermined number of turns 35. Similarly, the "−" end of the fiber is wound around the outside diameter by a predetermined number of turns 36. The extra turns 35 and 36 are axially displaced from one another. The predetermined number of trimming turns 35 and 36 can be selected to minimize the error resulting from the axial time varying temperature gradient experienced by the coil 20. Specifically, light beams can be injected into extremities 23 and 24 with coil 20 mounted on a stationary, stable platform and an axial time varying temperature gradient can be applied to the coil. The counterpropagating light beams exiting extremities 23 and 24 can be combined and the phase difference sensed. Turns 35 and 36 can then be wound until the error, which results from an axial time varying temperature gradient acting on the spatial displacement of the two halves of the coil, is minimized.

Figure 3:
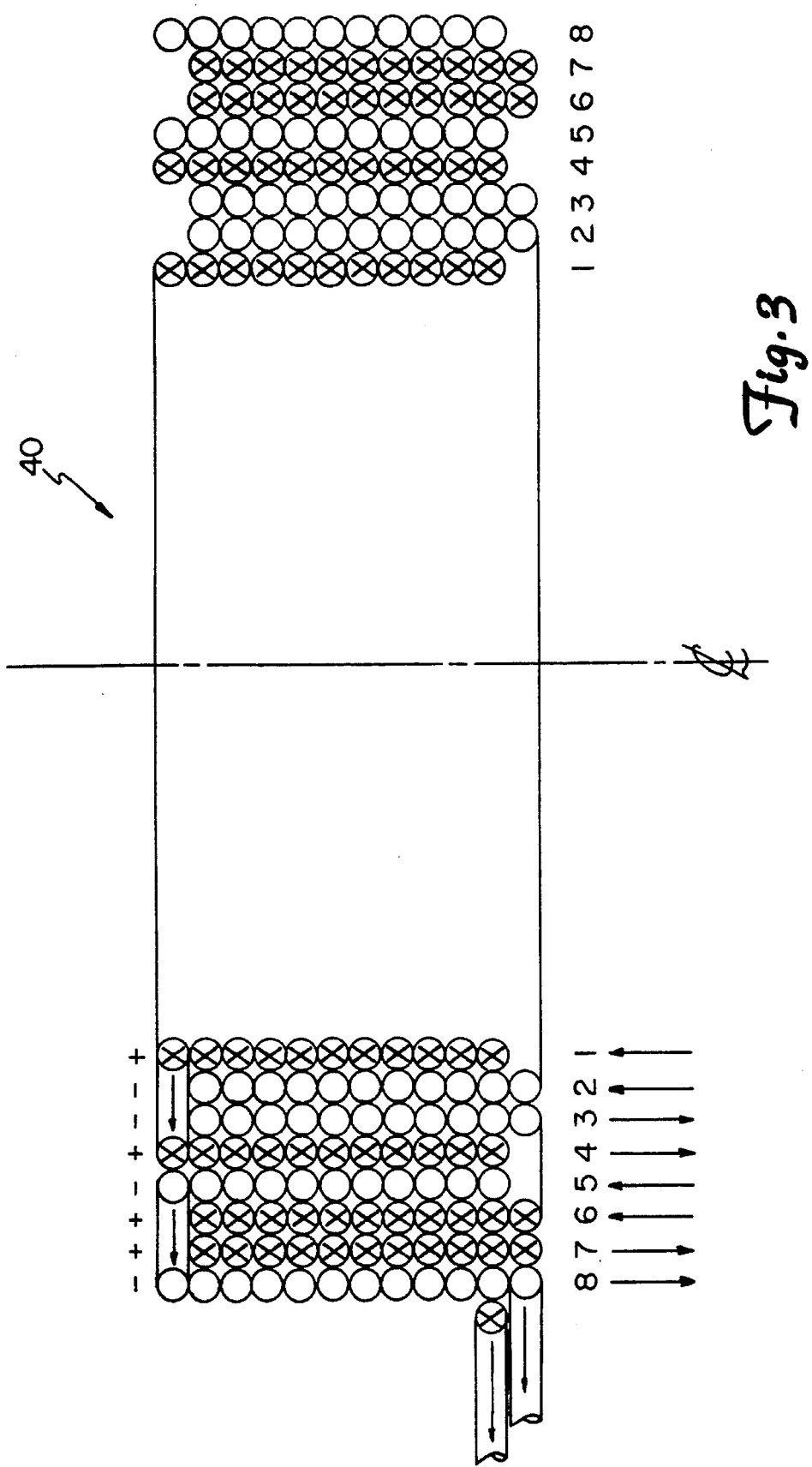
FIG. 3 shows a reverse quadrupole fiber optic coil arrangement.

Alternatively, axial time varying temperature gradient dependent errors can be materially reduced if the coil 40 as shown in FIG. 3 is wound using reversed quadrupoles. That is, the quadrupole comprising layers 1–4 is wound with a +−−+ layer configuration whereas the second quadrupole comprising layers 5–8 is wound with a −++− layer configuration. Specifically, the "+" end of the optical fiber, starting near the middle A/B of the fiber E, is used to wind layer 1, the "−" end is used to wind layers 2 and 3, and the "+" end is used to wind layer 4, the "−" end is used to wind layer 5, the "+" end is use to wind layers 6 and 7, and the "−" end is used to wind layer 8. Layers 1, 4, 6 and 7 may be wound in the clockwise direction and layers 2, 3, 5 and 8 may be wound in the counterclockwise direction. It can be seen that the spatial axial offset with respect to the "+" and "−" layers of the first quadrupole (layers 1–4) is reversed with respect to the "+" and "−" layers of the second quadrupole (layers 5–8). The axial sensitivity to time varying temperature gradients is reduced because the spatial asymmetry with respect to the "+" and "−" halves of the coils shown in FIGS. 1 and 2 is eliminated. Thus, although the error resulting from an axially oriented time varying temperature gradient has not been eliminated, it has been materially reduced and in many cases is tolerable. Moreover, error resulting from a radially oriented time varying temperature gradient is substantially eliminated.

Figure 4:
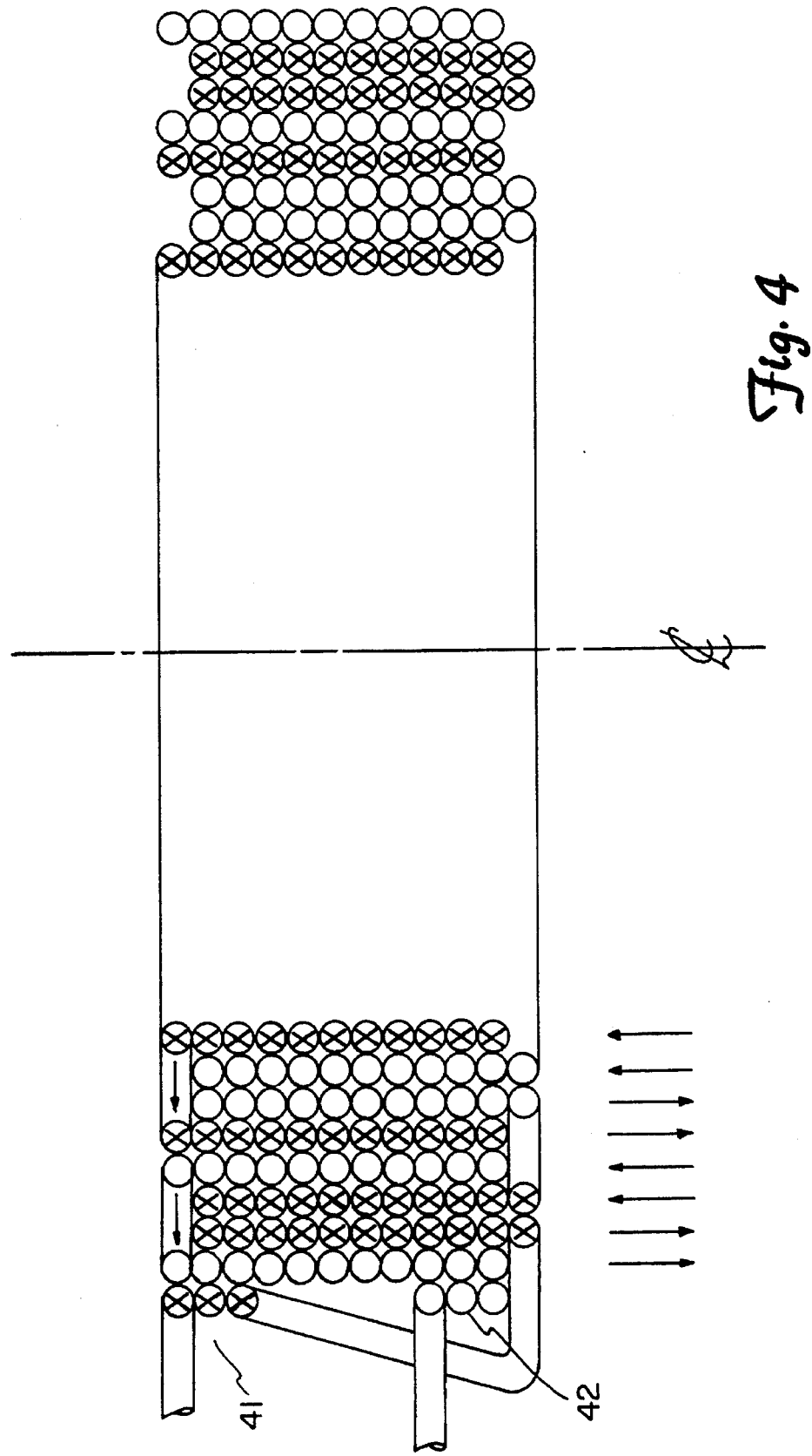
FIG. 4 shows a reverse quadrupole fiber optic coil having trimming turns around the outside circumference thereof in order to substantially eliminate axial time varying temperature gradient dependent errors.
Figure 5:
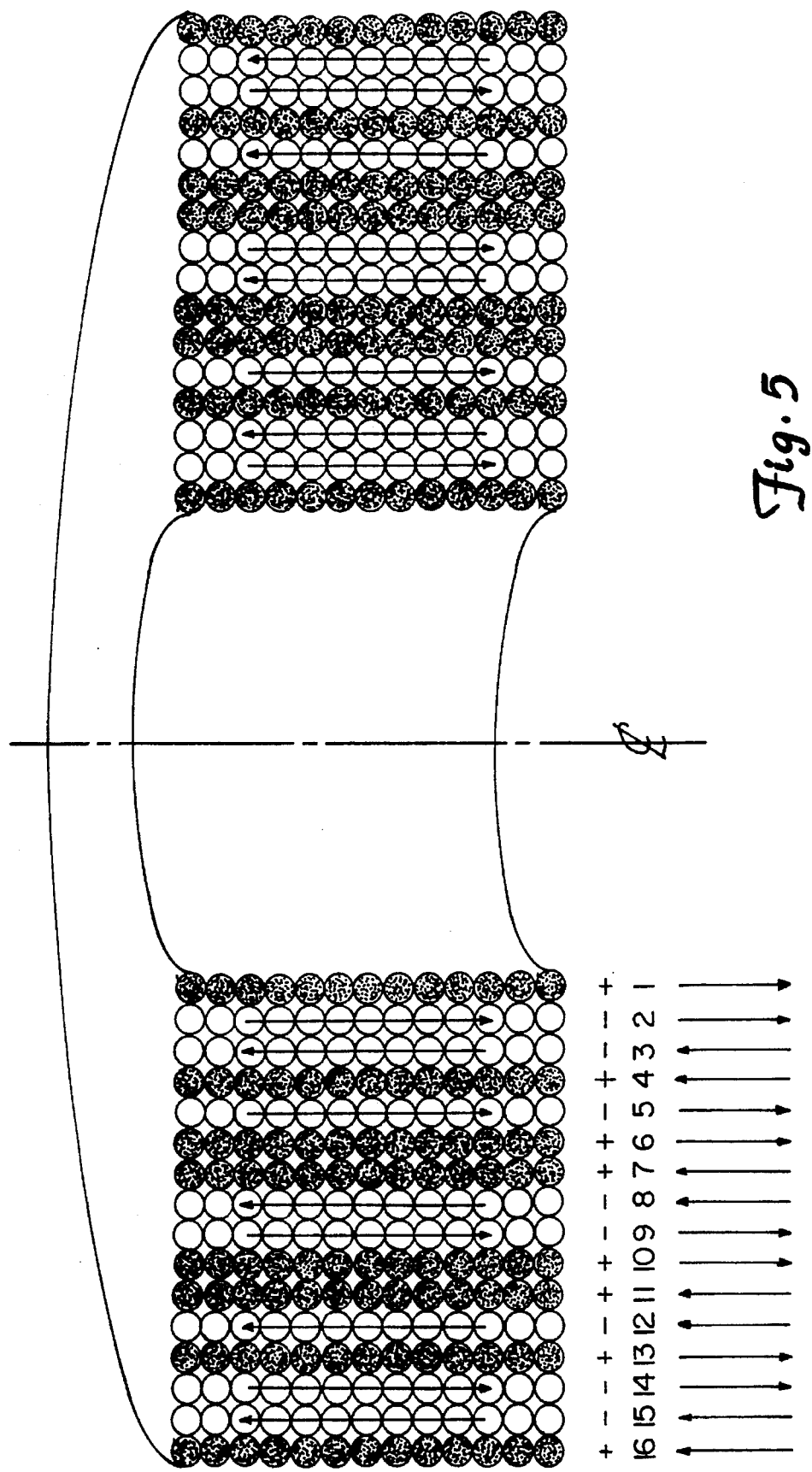
FIG. 5 shows a sixteen layer reverse octupole device which substantially eliminates axial and radial time varying temperature gradient dependent errors.

This reduced error resulting from an axially oriented time varying temperature gradient can be substantially eliminated either by the trimming turns 41 and 42 shown in FIG. 4 or by a reverse octupolar arrangement such as that shown in FIG. 5.

In FIG. 5, coil 50 is comprised of a quadrupole including layers 1–4 having a + − − + layer configuration and a quadrupole comprising layers 5–8 having a reverse layer configuration, i.e. − + + −. Thus, layers 1–8 form an octupole comprised of two reversely wound quadrupoles. Axially dependent time varying temperature errors can be substantially eliminated by adding a second reverse octupole comprising layers 9–16. This second octupole has a quadrupole comprising layers 9–12 wound with a − + + − layer configuration and a quadrupole comprising layers 13–16 wound with a + − − + layer configuration.

Accordingly, layer 1 is wound clockwise, in this case beginning at the top of coil 50, with the "+" end of an optical fiber. Layers 2 and 3 are wound counterclockwise in the direction of the arrows from the "−" end. The fourth layer is wound clockwise from the "+" end of the fiber in the direction of the arrow, the fifth layer is wound counterclockwise from the "−38 end of fiber in the direction of the arrow and layers 6 and 7 are wound clockwise from the "+" end of the fiber in the direction of the arrows. The eighth and ninth layers are wound counterclockwise from the "−" end of the fiber in the direction of the arrows, and so on. By reversing the octupoles, the error resulting from the axially applied time varying temperature gradient is substantially eliminated.

This sixteen layer reverse octupole arrangement likewise substantially eliminates radial time varying temperature gradient dependent errors since it is simply two octupolar layers back-to-back, i.e. reversed octupolar layers. However, the reversed octupolar arrangement improves on the axial symmetry and substantially eliminates axial time varying temperature gradient dependent errors.

Varying thermal gradient dependent errors in indicated rotation rate from an Interferometric Fiber Optic Gyro (IFOG) can be described with the following equation:

$$\Omega_e = \frac{nN\pi}{L^2} \frac{\Delta n}{\Delta T} \int_0^L \frac{\Delta T(l)}{\Delta t} (2l - L) dl \quad (2)$$

where "$\Omega_e$" is the erroneously indicated rotation rate, "n" is the index of refraction of the optical fiber, "N" is the total number of turns in the fiber optic sensing loop, "L" is the total length of the fiber optic sensing loop wherein the length of the fiber optic sensing loop includes the length of the fiber optic coil and the length of the optical leads between the beam splitter and the fiber optic coil, "$\Delta n/\Delta T$" is the thermal coefficient of "n" "l" is a variable indicating position along the fiber optic sensing loop, and "$\Delta T(l)/\Delta t$" is the function describing the change of temperature "T" over the length of the fiber optic sensing loop. Transforming equation (2) to a layer-by-layer summation and neglecting the typically short fiber optic leads that join the fiber optic coil to the beam splitter results in the following equation:

$$\Omega_e = \frac{nN\pi}{L^2} \frac{\Delta n}{\Delta T} \sum_{i=1}^{m} \int_{l_1(i)}^{l_2(i)} \frac{\Delta T(i)}{\Delta t} (2l - L) dl \quad (3)$$

where "i" is a variable indicating layer number, "m" is the number of layers in the fiber optic coil, "$l_1(i)$" is the length from the start of the fiber optic coil to the beginning of layer "i", "$l_2(i)$" is the length from the start of the fiber optic coil to the end of layer "i", and "$\Delta T(i)/\Delta t$" is the function describing the rate of temperature change of layer "i". The factors $l_1(i)$ and $l_2(i)$ can be given by the following equations:

$$l_1(i) = \frac{L}{m}(i-1) \quad (4)$$

and $$l_2(i) = \frac{L}{m} i \quad (5)$$

(It may be noted that these equations define equal lengths of fiber in each layer. In practice, this is a sufficiently accurate assumption and more easily illustrates the benefits of this invention.)

Performing the integration of equation (3) results in the following equation:

$$\Omega_e = \frac{nN\pi}{m^2} \frac{\Delta n}{\Delta T} \sum_{i=1}^{m} \frac{\Delta T(i)}{\Delta t} (2i - m - 1) \quad (6)$$

The first factor after the summation sign in equation (6) describes the changing temperature as a function of layer and the second parenthetical factor in equation (6) describes the weighting factor given each layer which is dependent on its position from the beginning of the coil.

The table shown in FIG. 6 gives an example of equation (6) and, therefore, of the canceling effect with regard to axial time varying temperature gradient effects in a sixteen layer device such as the one shown in FIG. 5. FIG. 6 schematically shows, along side the first column of numbers, the position along the length of the fiber of each layer within the coil. It should be noted that the layers shown in FIG. 6 have been assigned layer numbers which are different than the layer numbers shown in FIG. 5. The layer numbers of FIG. 6 show the position of each layer along the fiber length as seen by one of the light beams propagating therethrough. Thus, layer 1 shown in FIG. 6 corresponds to the outermost layer 16 shown in FIG. 5, layer 16 shown in FIG. 6 corresponds to the next outermost layer 15 shown in FIG. 5, and so on.

The first column of numbers in FIG. 6 contains the layer numbers for the sixteen layers of a coil wound in a − + + − + − − + + − − + − + + − configuration as indicated by the second column of FIG. 6. The second column contains weighting factors which depend upon the length of the fiber from the middle A/B of the fiber to the midpoint of the fiber in its respective layer and has a polarity corresponding to which end of the fiber is used to wind that corresponding layer. The third column shows temperature dependent factors, i.e. those factors in equation (6) dependent upon an axially applied time varying temperature gradient.

The fourth column of numbers in FIG. 6 represents the axial time varying temperature gradient error of each layer and results from multiplying the values in the second column by the corresponding value in the third column. The fifth column represents the accumulated error for each quadrupole of the layers shown at the left-hand side of FIG. 6. The last column of FIG. 6 shows the accumulated octupolar errors for each octupole.

As can be seen from FIG. 6, each quadrupole has a fairly sizable error as a result of the axial time varying temperature gradient which is applied to the sixteen layer coil. These errors will all be positive and will accumulate in a standard +--++--+ configuration. However, the net octupolar error resulting from a first quadrupole having a +--+ configuration and a reversed quadrupole having a -++- configuration reduces the error dramatically. This error can be substantially eliminated by using a reversed octupole as shown by the lower eight layers of FIG. 6. Accordingly, the first octupole gives an accumulated axial time varying temperature gradient dependent error of +8 while the second eight layers of the coil produce an accumulated time varying temperature gradient dependent error of −8. Because of the way in which the layers are wound with the −+−+−−++−−+−++− layer configuration, these octupolar errors cancel one another out leaving a substantially zero axial time varying temperature gradient dependent error.

FIG. 7 is a table showing representative values with respect to a radial time varying temperature gradient applied to a coil such as the coil of FIG. 5. Because the time varying temperature gradient is applied radially, the temperature factors in the third column will change linearly with regard to each layer. The fourth column of FIG. 7 shows the error of each layer whereas the fifth column shows the accumulated error for each quadrupole and the last column shows the accumulated error for each octupolar portion of the coil. As can be seen, only an eight layer coil is needed to substantially eliminate radial time varying temperature gradient dependent errors.

Accordingly, the present invention substantially eliminates errors due to both axial time varying temperature gradients and radial time varying temperature gradients. Thus, the need for a temperature stable environment for the fiber optic coil arrangement has been materially reduced.

The "+" and "−" symbols have been used to denote the difference between a layer wound from one end of the optical fiber and a layer wound from the other end of the optical fiber. Thus, in an octupolar winding arrangement, the first quadrupole can be wound with a +--+ layer configuration and the second quadrupole can be wound with a -++- layer configuration or the first quadrupole can be wound with a -++- layer configuration and the second quadrupole can be wound with a +--+ layer configuration. Furthermore, the sixteen layer arrangement may have a +--+-++--++-+--+ layer con-figuration or a -++-+--++--+-++- layer configuration.

While this invention has been described in its preferred embodiments, its scope is not limited thereto. Rather, it is only limited so far as to find the following set of claims.

We claim:

1. A fiber optic coil having at least one octupole, said octupole being wound from an optical fiber having first and second ends, said octupole comprising:

a first layer of turns formed of said first end;

a second layer of turns formed of said second end, said second layer of turns overlying said first layer of turns;

a third layer of turns formed of said second end, said third layer of turns overlying said second layer of turns;

a fourth layer of turns formed of said first end, said fourth layer of turns overlying said third layer of turns;

a fifth layer of turns formed of said second end, said fifth layer of turns overlying said fourth layer of turns;

a sixth layer of turns formed of said first end, said sixth layer of turns overlying said fifth layer of turns;

a seventh layer of turns formed of said first end, said seventh layer of turns overlying said sixth layer of turns; and, an eighth layer of turns formed of said second end, said eighth layer of turns overlying said seventh layer of turns.

2. The fiber optic coil of claim 1 wherein said first, fourth, sixth and seventh layers of said octupole comprise turns all of which are wound in either a clock-wise or a counter-clockwise direction and wherein said second, third, fifth and eighth layers of said octupole comprise turns all of which are wound in the other of said directions.

3. The fiber optic coil of claim 2 further comprising a first extra length of said first end and a second extra length of said second end, said first and second extra lengths being spatially displaced from one another and being arranged so that error between phases of light counterpropagating through said fiber is reduced.

4. The fiber optic coil of claim 2 wherein said fiber optic coil has an inside perimeter and an outside perimeter and wherein said fiber optic coil further comprises a first number of turns of said first end wound around said outside perimeter and a second number of turns of said second end wound around said outside perimeter, said first and second number of turns and placement of said first and second number of turns being selected to reduce error between phases of light counterpropagating through said fiber.

5. The fiber optic coil of claim 1 wherein said fiber optic coil has an inside perimeter and an outside perimeter and wherein said fiber optic coil further comprises a first number of turns of said first end wound around said outside perimeter and a second number of turns of said second end wound around said outside perimeter, said first and second number of turns selected to reduce error between phases of light counterpropagating through said fiber.

6. A fiber optic coil having at least two octupoles, said octupoles being wound from an optical fiber having first and second ends, said octupoles comprising:

a first layer of turns formed of said first end;

a second layer of turns formed of said second end, said second layer of turns overlying said first layer of turns;

a third layer of turns formed of said second end, said third layer of turns overlying said second layer of turns;

a fourth layer of turns formed of said first end, said fourth layer of turns overlying said third layer of turns;

a fifth layer of turns formed of said second end, said fifth layer of turns overlying said fourth layer of turns;

a sixth layer of turns formed of said first end, said sixth layer of turns overlying said fifth layer of turns;

a seventh layer of turns formed of said first end, said seventh layer of turns overlying said sixth layer of turns;

an eighth layer of turns formed of said second end, said eighth layer of turns overlying said seventh layer of turns;

a ninth layer of turns formed of said second end, said ninth layer of turns overlying said eighth layer of turns;

a tenth layer of turns formed of said first end, said tenth layer of turns overlying said ninth layer of turns;

an eleventh layer of turns formed of said first end, said eleventh layer of turns overlying said tenth layer of turns;

a twelfth layer of turns formed of said second end, said twelfth layer of turns overlying said eleventh layer of turns;

a thirteenth layer of turns formed of said first end, said thirteenth layer of turns overlying said twelfth layer of turns;

a fourteenth layer of turns formed of said second end, said fourteenth layer of turns overlying said thirteenth layer of turns;

a fifteenth layer of turns formed of said second end, said fifteenth layer of turns overlying said fourteenth layer of turns; and, a sixteenth layer of turns formed of said first end, said sixteenth layer of turns overlying said fifteenth layer of turns.

7. The coil of claim 6 wherein said first, fourth, sixth, seventh, tenth, eleventh, thirteenth and sixteenth layers comprise turns all of which are wound in either a clockwise or a counterclockwise direction and wherein said second, third, fifth, eighth, ninth, twelfth, fourteenth and fifteenth layers comprise turns all of which are wound in the other of said directions.

8. A coil wound from an optical fiber having first and second ends, said coil having an integer number of sections, each section comprising:

a first layer of turns formed of said first end;

a second layer of turns formed of said second end, said second layer of turns overlying said first layer of turns;

a third layer of turns formed of said second end, said third layer of turns overlying said second layer of turns;

a fourth layer of turns formed of said first end, said fourth layer of turns overlying said third layer of turns;

a fifth layer of turns formed of said second end, said fifth layer of turns overlying said fourth layer of turns;

a sixth layer of turns formed of said first end, said sixth layer of turns overlying said fifth layer of turns;

a seventh layer of turns formed of said first end, said seventh layer of turns overlying said sixth layer of turns; and, an eighth layer of turns formed of said second end, said eighth layer of turns overlying said seventh layer of turns.

9. The coil of claim 8 wherein said first, fourth, sixth and seventh layers comprise turns all of which are wound in either a clockwise or a counterclockwise direction and wherein said second, third, fifth and eighth layers comprise turns all of which are wound in the other of said directions.

10. The coil of claim 9 wherein said coil has an inside coil perimeter and an outside coil perimeter and wherein said coil further comprises a first number of turns of said first end wound around said outside coil perimeter and a second number of turns of said second end wound around said outside coil perimeter, said first and second number of turns and placement of said first and second number of turns being selected to reduce error between phases of light counter-propagating through said fiber.

11. The coil of claim 8 wherein said coil has an inside coil perimeter and an outside coil perimeter and wherein said coil further comprises a first number of turns of said first end wound around said outside coil perimeter and a second number of turns of said second end wound around said coil outside perimeter, said first and second number of turns and placement of said first and second number of turns being selected to reduce error between phases of light counter-propagating through said fiber.

12. A coil wound from an optical fiber having first and second ends and an intermediate portion, said coil having an integer number of sections, each section comprising:

a first layer of turns formed of said first end;

a second layer of turns formed of said second end, said second layer of turns overlying said first layer of turns;

a third layer of turns formed of said second end, said third layer of turns overlying said second layer of turns;

a fourth layer of turns formed of said first end, said fourth layer of turns overlying said third layer of turns;

a fifth layer of turns formed of said second end, said fifth layer of turns overlying said fourth layer of turns;

a sixth layer of turns formed of said first end, said sixth layer of turns overlying said fifth layer of turns;

a seventh layer of turns formed of said first end, said seventh layer of turns overlying said sixth layer of turns;

an eighth layer of turns formed of said second end, said eighth layer of turns overlying said seventh layer of turns;

a ninth layer of turns formed of said second end, said ninth layer of turns overlying said eighth layer of turns;

a tenth layer of turns formed of said first end, said tenth layer of turns overlying said ninth layer of turns;

an eleventh layer of turns formed of said first end, said eleventh layer of turns overlying said tenth layer of turns;

a twelfth layer of turns formed of said second end, said twelfth layer of turns overlying said eleventh layer of turns;

a thirteenth layer of turns formed of said first end, said thirteenth layer of turns overlying said twelfth layer of turns;

a fourteenth layer of turns formed of said second end, said fourteenth layer of turns overlying said thirteenth layer of turns;

a fifteenth layer of turns formed of said second end, said fifteenth layer of turns overlying said fourteenth layer of turns; and, a sixteenth layer of turns formed of said first end, said sixteenth layer of turns overlying said fifteenth layer of turns.

13. The coil of claim 12 wherein said first, fourth, sixth, seventh, tenth, eleventh, thirteenth and sixteenth layers comprise turns all of which are wound in either a clockwise or a counterclockwise direction and wherein said second, third, fifth, eighth, ninth, twelfth, fourteenth and fifteenth layers comprise turns all of which are wound in the other of said directions.

14. A method of winding an octupole for an optical coil from an optical fiber having first and second fiber ends, said coil having first and second coil ends, said method comprising:

(a) forming a first layer of turns by winding said first end of said fiber from said first coil end to said second coil end;

(b) forming a second layer of turns by winding said second end of said fiber from said first coil end to said second coil end;

(c) forming a third layer of turns by winding said second end of said fiber around said second layer from said second coil end to said first coil end;

(d) forming a fourth layer of turns by winding said first end of said fiber around said third layer from said second coil end to said first coil end;

(e) forming a fifth layer of turns by winding said second end of said fiber around said fourth layer from said first coil end to said second coil end;

(f) forming a sixth layer of turns by winding said first end of said fiber around said fifth layer from said first coil end to said second coil end;

(g) forming a seventh layer of turns by winding said first end of said fiber around said fifth layer from said second coil end to said first coil end; and, (h) forming an eighth layer of turns by winding said second end of said fiber around said seventh layer from said second coil end to said first coil end.

15. The method of claim 14 wherein said turns may be wound in either a clockwise or a counterclockwise direction and wherein said turns of said first, fourth, sixth and seventh layers are wound in one of said directions and said turns of said second, third, fifth and eighth layers are wound in the other of said directions.

16. The method of claim 15 wherein said coil has an outside perimeter and wherein a first number of turns of said first end are wound around said outside perimeter and a second number of turns of said second end are wound around said outside perimeter, said first and second number of turns and placement of said first and second number of turns being selected to reduce error between phases of light counterpropagating through said fiber.

17. The method of claim 15 a first extra length of said first end and a second extra length of said second end are spatially displaced from one another and are arranged so that error between phases of light counterpropagating through said fiber is reduced.

18. The method of claim 14 wherein said coil has an outside perimeter and wherein a first number of turns of said first end are wound around said outside perimeter and a second number of turns of said second end are wound around said outside perimeter, said first and second number of turns and placement of said first and second number of turns being selected to reduce error between phases of light counterpropagating through said fiber.

19. A method of winding a pair of adjacent octupoles for an optical coil from an optical fiber having first and second fiber ends, said coil having first and second coil ends, said method comprising:

(a) forming a first layer of turns winding said first end of said fiber from said first coil end to said second coil end;

(b) forming a second layer of turns by winding said second end of said fiber around said first layer from said first coil end to said second coil end;

(c) forming a third layer of turns by winding said second end of said fiber around said second layer from said second coil end to said first coil end;

(d) forming a fourth layer of turns by winding said first end of said fiber around said third layer from said second coil end to said first coil end;

(e) forming a fifth layer of turns by winding said second end of said fiber around said fourth layer from said first coil end to said second coil end;

(f) forming a sixth layer of turns by winding said first end of said fiber around said fifth layer from said first coil end to said second coil end;

(g) forming a seventh layer of turns by winding said first end of said fiber around said fifth layer from said second coil end to said first coil end;

(h) forming an eighth layer of turns by winding said second end of said fiber around said seventh layer from said second coil end to said first coil end;

(i) forming a ninth layer of turns by winding said second end of said fiber around said eighth layer from said first coil end to said second coil end;

(j) forming a tenth layer of turns by winding said first fiber end around said ninth layer from said first coil end to said second coil end;

(k) forming an eleventh layer of turns by winding said first fiber end around said tenth layer from said second coil end to said first coil end;

(l) forming a twelfth layer of turns by winding said second fiber end around said eleventh layer from said second coil end to said first coil end;

(m) forming a thirteenth layer of turns by winding said first fiber end around said twelfth layer from said first coil end to said second coil end;

(n) forming a fourteenth layer of turns by winding said second fiber end around said thirteenth layer from said first coil end to said second coil end;

(o) forming a fifteenth layer of turns by winding said second fiber end around said fourteenth layer from said second coil end to said first coil end; and, (p) forming a sixteenth layer of turns by winding said first fiber end around said fifteenth layer from said second coil end to said first coil end.

20. The method of claim 19 wherein said turns may be wound in either a clockwise or a counterclockwise direction and wherein said turns of said first, fourth, sixth, seventh, tenth, eleventh, thirteenth and sixteenth layers are wound in one of said directions and said turns of said second, third, fifth, eighth, ninth, twelfth, fourteenth and fifteenth layers are wound in the other of said directions.

21. A fiber optic coil having at least two quadrupoles, each of said quadrupoles having four layers of turns wherein, if a layer is wound predominantly from a first end of an optical fiber, it is designated a "+" layer and, if a layer is wound predominantly from a second end of an optical fiber, it is designated a "−" layer, and wherein one of said quadrupoles has a +−−+ layer configuration and wherein the other of said quadrupoles has a −++− layer configuration.

22. A multilayer coil for a fiber optic rate sensor, the multilayer coil having an optical path from a first end of an optical fiber to a second end of the optical fiber, the multilayer coil comprising a first plurality n of layers formed from the optical fiber, and a second plurality k of layers formed from the optical fiber, wherein the layers of the first plurality of layers are wound from the optical fiber so that axial spatial offsets exist in the first plurality of layers, and wherein the layers of the second plurality of layers are wound from the optical fiber so that axial spatial offsets exist in the second plurality of layers and so that errors produced by time varying, axial position dependent changes to the second plurality of layers substantially cancel errors produced by time varying, axial position dependent changes to the first plurality of layers.

23. The multilayer coil of claim 22 wherein n and k are equal.

24. The multilayer coil of claim 22 wherein the multilayer coil has a first end and a second end, wherein the first plurality of layers are wound in a first predetermined pattern from the first end of the multilayer coil to the second end of the multilayer coil and back to the first end of the multilayer coil, wherein the second plurality of layers are wound in a second predetermined pattern from the first end of the multilayer coil to the second end of the multilayer coil and back to the first end of the multilayer coil, and wherein the second predetermined pattern is the reverse of the first predetermined pattern.

25. The multilayer coil of claim 24 wherein n and k are equal.

26. A multilayer coil for a fiber optic rate sensor, the multilayer coil having an axial direction and an optical path from a first end of an optical fiber to a second end of the optical fiber, the multilayer coil comprising a plurality of layers n formed from the optical fiber, wherein the layers of the plurality of layers are wound from the optical fiber so that, on average, half-diameter axial spatial offsets exist between adjacent layers wound from the first and second ends of the optical fiber, and wherein the plurality of layers are wound from the optical fiber so as to substantially cancel error effects of the half-diameter axial spatial offsets.

* * * * *

UNITED STATES PATENT AND TRADEMARK OFFICE
CERTIFICATE OF CORRECTION

PATENT NO. : 5,475,774
DATED : December 12, 1995
INVENTOR(S) : RANDY P. GOETTSCHE and RALPH A. BERGH It is certified that error appears in the above-identified patent and that said Letters Patent is hereby corrected as shown below:

Column 5, line 41, "-38" should be "-".

Column 5, line 65, "$\Omega_c$" should be --$\Omega_e$--.

Column 6, line 5, "n" should be --"n",--.

Column 6, lines 62-63, " +-- . . . +-- + +--- +-- + +--" should be "- + +- +-- + +-- +- + +-" (no quotation marks).

Signed and Sealed this

Fourteenth Day of May, 1996

Attest:

BRUCE LEHMAN

*Attesting Officer*  *Commissioner of Patents and Trademarks*